(12) United States Patent
Galloway et al.

(10) Patent No.: US 7,316,833 B1
(45) Date of Patent: Jan. 8, 2008

(54) MULTI-LAYER THERMOPLASTIC FILMS AND PACKAGES MADE THEREFROM

(75) Inventors: Deane E. Galloway, Appleton, WI (US); Keith D. Lind, Appleton, WI (US); Dennis J. Kittel, Neenah, WI (US); George H. Walbrun, Menasha, WI (US); Johnny Q. Zheng, Appleton, WI (US)

(73) Assignee: Penchiney Emballage Flexible Europe, Rueil Malmaison (FR)

( * ) Notice: Subject to any disclaimer, the term of this patent is extended or adjusted under 35 U.S.C. 154(b) by 0 days.

(21) Appl. No.: 09/369,980

(22) Filed: Jul. 30, 1999

Related U.S. Application Data (60) Division of application No. 08/899,410, filed on Jul. 23, 1997, which is a continuation of application No. 08/481,685, filed on Jun. 7, 1995, now abandoned, which is a continuation-in-part of application No. 08/082,226, filed on Jun. 24, 1993, now abandoned.

(51) Int. Cl.
*A47G 19/22* (2006.01)

(52) U.S. Cl. ............... 428/34.6; 428/35.2; 428/36.6; 428/422; 428/518

(58) Field of Classification Search ............ 428/35.2, 428/35.4, 34.4, 34.7, 514, 518, 349, 215, 428/214, 34.8, 34.6, 36.6, 422
See application file for complete search history.

(56) References Cited

U.S. PATENT DOCUMENTS

| | | |
|---|---|---|
| 3,090,998 A | 5/1963 | Heisterkamp et al. ......... 18/57 |
| 3,161,629 A | 12/1964 | Gorsich |
| 3,579,491 A | 5/1971 | Carrega et al. |
| 3,645,992 A | 2/1972 | Elston ..................... 260/80.78 |
| 4,141,027 A | 2/1979 | Baldwin et al. |
| 4,154,815 A | 5/1979 | Pader |
| 4,169,910 A | 10/1979 | Graboski |
| 4,194,039 A | 3/1980 | Mueller |
| 4,254,169 A | 3/1981 | Schroeder |
| 4,302,565 A | 11/1981 | Goeke et al. |
| 4,302,566 A | 11/1981 | Karol et al. |
| 4,364,989 A | 12/1982 | Moyle |
| 4,400,428 A | 8/1983 | Rosenthal et al. |
| 4,418,841 A | 12/1983 | Eckstein |
| 4,429,079 A | 1/1984 | Shibata et al. |
| 4,444,828 A | 4/1984 | Anthony et al. |
| 4,451,512 A | 5/1984 | Yazaki et al. |
| 4,457,960 A | 7/1984 | Newsome ..................... 428/35 |
| 4,469,742 A | 9/1984 | Oberle et al. |
| 4,469,753 A | 9/1984 | Yoshimura et al. ...... 428/475.8 |
| 4,501,634 A | 2/1985 | Yoshimura et al. |
| 4,501,780 A | 2/1985 | Walters et al. |
| 4,505,970 A | 3/1985 | Craver |
| 4,532,189 A | 7/1985 | Mueller |
| 4,540,567 A | 9/1985 | Oneto et al. |
| 4,540,753 A | 9/1985 | Cozewith et al. |
| 4,551,380 A | 11/1985 | Schoenberg |
| 4,557,780 A | 12/1985 | Newsome et al. ..... 156/244.11 |
| 4,615,922 A | 10/1986 | Newsome et al. ............ 428/35 |
| 4,640,856 A | 2/1987 | Ferguson et al. |
| 4,647,483 A | 3/1987 | Tse et al. |
| 4,649,044 A | 3/1987 | Gomi et al. |
| 4,680,353 A | 7/1987 | Ishihara et al. |
| 4,695,491 A | 9/1987 | Kondo et al. ................. 428/35 |
| 4,701,432 A | 10/1987 | Welborn, Jr. |
| 4,724,185 A | 2/1988 | Shah |
| 4,777,095 A | 10/1988 | Kondo et al. ............ 428/476.1 |
| 4,788,105 A | 11/1988 | Mueller et al. ............. 428/412 |
| 4,801,652 A | 1/1989 | Mizutani et al. |
| 4,803,122 A | 2/1989 | Schirmer .................... 428/349 |
| 4,808,842 A | 2/1989 | Benge et al. |
| 4,859,513 A | 8/1989 | Gibbons et al. |
| 4,863,768 A | 9/1989 | Ishio et al. ................ 428/34.9 |
| 4,863,769 A | 9/1989 | Lustig et al. |
| 4,871,705 A | 10/1989 | Hoel .......................... 502/117 |
| 4,891,253 A | 1/1990 | Mueller ..................... 428/35.2 |
| 4,894,107 A | 1/1990 | Tse et al. |
| 4,935,397 A | 6/1990 | Chang |
| 4,940,612 A | 7/1990 | Gibbons et al. |
| 4,950,510 A | 8/1990 | Massouda |
| 4,952,451 A | 8/1990 | Mueller |
| 4,957,946 A | 9/1990 | Meier et al. |

(Continued)

FOREIGN PATENT DOCUMENTS

| | | |
|---|---|---|
| EP | 0 120 503 | 3/1984 |
| EP | 0 170 385 | 2/1988 |
| EP | 0 416815 | 3/1991 |
| EP | A 0 451 997 | 10/1991 |
| EP | 0 516 019 | 12/1992 |

(Continued)

OTHER PUBLICATIONS

Peterson, *Metallo-Organic Chemistry*, Wiley and Sons, pp. 310-313, 1985.
Encyclopedia of Polymer Science and Engineering, *FILMS, Manufacture*, vol. 7, pp. 88-89, 1987.
Schut, *Enter a New Generation of Polyolefins*, Plastic Technology, pp. 15-17, Nov. 1991.
Childress, B.C., *Properties of Homogeneous and Heterogeneous Polyolefins*: . . . (May, 1994).

(Continued)

*Primary Examiner*—Leszek Kiliman
(74) *Attorney, Agent, or Firm*—Banner & Witcoff, Ltd.

(57) ABSTRACT

A multilayer thermoplastic film, and packages made from the film, comprising a layer of ethylene vinyl alcohol (EVOH) as an oxygen barrier layer, a layer of a polymer or copolymer formed by the polymerization reaction with a single site catalyst and ethylene vinyl acetate (EVA) as a sealant layer, and alternatively containing a layer of EVA, said film having improved sealability and improved clarity as compared to conventional films.

5 Claims, 1 Drawing Sheet

U.S. PATENT DOCUMENTS

| | | | |
|---|---|---|---|
| 4,976,898 A | 12/1990 | Lustig et al. | |
| 4,985,188 A | 1/1991 | Ishio et al. | |
| 4,997,710 A | 3/1991 | Pockat et al. | |
| 5,001,016 A | 3/1991 | Kondo et al. | |
| 5,004,647 A | 4/1991 | Shah | |
| 5,032,463 A | 7/1991 | Smith | |
| 5,055,438 A | 10/1991 | Canich | |
| 5,057,475 A | 10/1991 | Canich et al. | |
| 5,059,459 A | 10/1991 | Huffman | |
| 5,059,481 A | 10/1991 | Lustig et al. | |
| 5,064,797 A | 11/1991 | Stricklen | 502/111 |
| 5,073,420 A | 12/1991 | Yano et al. | |
| 5,084,534 A | 1/1992 | Welborn, Jr. et al. | |
| 5,089,321 A | 2/1992 | Chum et al. | |
| 5,089,536 A | 2/1992 | Palazotto | 522/16 |
| 5,202,402 A | 4/1993 | Funaki et al. | |
| 5,204,402 A | 4/1993 | Foster et al. | 526/336 |
| 5,206,075 A | 4/1993 | Hodson, Jr. | |
| 5,246,753 A | 9/1993 | Koyama et al. | |
| 5,262,228 A | 11/1993 | Kohyama et al. | |
| 5,272,016 A | 12/1993 | Ralph | |
| 5,272,236 A | 12/1993 | Lai et al. | 526/348.5 |
| 5,278,272 A | 1/1994 | Lai et al. | |
| 5,279,872 A | 1/1994 | Ralph | |
| 5,283,128 A | 2/1994 | Wilhoit | 428/516 |
| 5,298,326 A | 3/1994 | Norpoth et al. | 428/349 |
| 5,302,344 A | 4/1994 | Perlman | |
| 5,336,746 A | 8/1994 | Tsutsui et al. | 526/348.6 |
| 5,358,792 A | 10/1994 | Mehta et al. | |
| 5,374,459 A | 12/1994 | Mumpower et al. | |
| 5,376,439 A | 12/1994 | Hodson et al. | 428/220 |
| 5,397,613 A | 3/1995 | Georgelos | 428/36.7 |
| 5,397,640 A | 3/1995 | Georgelos et al. | 428/349 |
| 5,427,807 A | 6/1995 | Chum et al. | |
| 5,539,066 A | 7/1996 | Winter et al. | |
| 5,562,958 A | 10/1996 | Walton et al. | 428/34.9 |
| 5,582,923 A | 12/1996 | Kale et al. | |
| 5,593,747 A | 1/1997 | Gerogelos | |
| 5,604,043 A * | 2/1997 | Ahlgren | 428/518 |
| 5,620,758 A | 4/1997 | Babrowicz | |
| 5,629,059 A | 5/1997 | Desai et al. | |
| 5,698,279 A | 12/1997 | Vicik | |
| 5,707,751 A | 1/1998 | Garza et al. | |
| 5,770,318 A | 6/1998 | Friedman | |
| 5,804,264 A | 9/1998 | Bowen | |
| 5,834,077 A | 11/1998 | Babrowicz | |
| 5,837,335 A * | 11/1998 | Babrowiz | 428/34.9 |
| 5,852,152 A | 12/1998 | Walton et al. | |
| 5,866,214 A * | 2/1999 | Ramesh | 428/34.8 |
| 5,874,139 A * | 2/1999 | Bosiers et al. | 428/35.2 |
| 5,895,694 A * | 4/1999 | Zavadsky et al. | 428/36.7 |
| 5,928,727 A | 7/1999 | Timmer | |
| H1816 H | 11/1999 | Babrowicz | |
| 5,993,922 A | 11/1999 | Babrowicz et al. | |
| 6,010,792 A | 1/2000 | Lind et al. | |
| 6,044,662 A | 4/2000 | Brady et al. | |
| 6,074,715 A | 6/2000 | Lind et al. | |
| 6,291,038 B1 | 9/2001 | Babrowicz | |
| 6,358,577 B1 | 3/2002 | Bowen et al. | |
| 6,437,064 B1 * | 8/2002 | Eckstein et al. | 526/160 |
| 6,447,860 B1 | 9/2002 | Mueller et al. | |
| 6,511,568 B1 * | 1/2003 | Eckstein et al. | 156/216 |
| 6,514,583 B1 | 2/2003 | Ahlgren et al. | |

FOREIGN PATENT DOCUMENTS

| | | |
|---|---|---|
| EP | A 0516019 | 12/1992 |
| EP | A 0552911 | 7/1993 |
| EP | 0 577 432 | 5/1994 |
| EP | 0 597 502 | 5/1994 |
| EP | 0 628 593 | 12/1994 |
| EP | 0 701 897 | 3/1996 |
| EP | 0 810 087 | 12/1997 |
| JP | 58-102762 | 6/1983 |
| JP | 83/102752 | 6/1983 |
| JP | 03-026541 | 2/1992 |
| JP | A 03 026541 | 2/1992 |
| WO | 87/03887 | 7/1987 |
| WO | 92/14784 | 9/1992 |
| WO | A 92 14784 | 9/1992 |
| WO | 93/03093 | 2/1993 |
| WO | A 9406857 | 3/1994 |
| WO | 94/09060 | 4/1994 |
| WO | A 9407954 | 4/1994 |
| WO | 94/16674 | 8/1994 |
| WO | A 9418263 | 8/1994 |
| WO | 95/00333 | 1/1995 |
| WO | 95/04761 | 2/1995 |
| WO | 98/17469 | 4/1998 |

OTHER PUBLICATIONS

Lai, S. et al., *Dow Rheology Index (DRI) for Insite Technology Polyolefins (ITP):* . . . , ANTEC '94, pp. 1814-1815 (1994).

Chowdbury, Jayadev et al., *Polymers by Blueprint*, Chemical Engineering, vol. 100/No. 4, p. 34 (Apr. 1993).

Sinclair, K.B., *New Polyolefins From Emerging Catalyst Technologies*, Society of Plastics Engineers Polyolefins VIII Int'l. Conf. (Feb. 21-24, 1993).

Ulbricht, et al., Abstr. of Plaste Kaut. 18(4), CAPLUS 1971:421192, pp. 250-254, 1971.

Sinh, H.J. et al., Adv. Organomet. Chem. 18, 99, pp. 123-130, 1980.

Godian et al., *Principles of Polymerization*, 2d Ed., Wiley, New York, pp. 99-102 & 616, 1981.

Ahadian et al., *Abstr. of Proc IUPAC Macromed Symp.*, 28th, CAPLUS 1983:522989, p. 256 (1982).

Moore, Stephen, *Crystalline PS is Claimed to Yield Engineering-Resin Performance*, Modern Plastics, vol. 69/No. 11, p. 30 (Nov. 1992).

Lai, S. et al., *CGCT: New Rules for Ethylene α-Olefin Interpolymers-Controlled Melt Rheology Polyolefins*, ANTEC '93, pp. 1188-1192 (1993).

Van der Sanden, D., *A New Family of Linear Ethylene Polymers with Enhanced Sealing Performance Designed for Multilayer Barrier Food Packaging Films*, ANTEC '93, pp. 46-50 (1993).

Patel, R.M. et al., *Investigation of Processing-Structure-Properties Relationships in Polyethylene Blown Films*, ANTEC '93, pp. 465-467 (1993).

Butler, T.I. et al., *Blown Film Bubble Forming and Quenching Effects on Film Properties*, ANTEC '93, pp. 51-57 (1993).

Woo, L. et al., *Thermoplastic Elastomer Behavior of Ultra-Low Density Polyethylene and a Comparison with Flexible PVC*, ANTEC '93, pp. 358-363 (1993).

Story, B.A. et al., *The New Family of Polyolefins from INSITE\* Technology*, METCON '93 (1993).

Leaversuch, Robert D., *New Process Technologies May Expand Properties, Markets*, Modern Plastics, vol. 70/No. 1, p. 58 (Jan. 1993).

Leaversuch, Robert D., *Reformulations, Redesigns, Upgrade Blood Devices*, Modern Plastics, vol. 70/No. 2, p. 44 (Feb. 1993).

Edmondson, M.S. et al., *CGCT: New Rules for Ethylene Alpha-Olefin Interpolymers-Processing-Structure-Property Relationships in Blown Films*, ANTEC '93, pp. 63-65 (Feb. 1993).

Kiesche, Elizabeth S., *Catalysts, Additives, Environment Head Up CMRA Meeting Agenda*, Chemical Week, p. 10, (Feb. 3, 1993).

*Union Carbide Unveils Unipol II*, Press Association Newfile, (Mar. 1, 1993).

*Union Carbide Unveils Unipol II Process,* . . . , Plastics Focus, vol. 25, No. 5 (Mar. 8, 1993).

Rotman, David, *Carbide to Debut Unipol II Technology at New Plant*, Chemical Week, p. 6 (Mar. 10, 1993).

Kaminsky, W. et al., *Structure Dependence of Polypropylenes on Structural Elements of Metallocene Catalysts*, Institute for Technical and Macromolecular Chemistry, University of Hamburg, PMSE #14.

Chien, James C.W., *Stereochemical Control of Synthesis of Polyolefins Having New Structures*, Department of Polymer Science and Engineering, University of Massachusetts, Amherst, MA 01003, PMSE #15.

Swogger, Kurt W. et al., *Process Technology for Unique Polymer Design Using DOW Constrained Geometry Catalyst*, SPE VII International Polyolefins RETEC Conference Proceedings, pp. 13-20 (1993).

Sherman, J., *Polyolefins*, Chemical Engineering, vol. 99, No. 8, p. 61.

Miller, Bernie, *New Film Resins Push Performance*, Plastics World, vol. 50/No. 6, p. 46 (May, 1992).

Leaversuch, Robert, *Polyolefins Gain Higher Performance from New Catalyst Technologies*, Modern Plastics, pp. 46-49 (Oct. 1991).

Nifant'ev, I.E. et al., *ansa-Metallocene Derivatives of $Ti^{IV}$ and $Zr^{IV}$ With the Shortest—$C(CH_3)_2$- Bridge*, Journal of Organometallic Chemistry, vol. 435, pp. 37-42 (1992).

Van der Sanden, D., *A New Family of Linear Ethylene Polymers*, TAPPI Proceedings, pp. 289-296 (1991).

*Exxon Cities 'Breakthrough' in Olefins Polymerization*, Modern Plastics, vol. 68/No. 7, p. 61 (Jul. 1991).

McKeever, Dennis, *Dow Plastics Editor Briefing* (Dec. 17, 1991).

Sishta, Chand et al., *Group 4 Metallocene-Allumoxane Olefin Polymerization Catalysts*, J. Am. Chem. Soc., vol. 114, pp. 1112-1114 (1992).

Swogger, Kurt W., *The Material Properties of Polymers Made from Constrained Geometry Catalysts*, SPO '92, pp. 155-165 (1992).

Collins, Scott et al., *Polymerization of Propylene Using Supported, Chiral, ansa-Metallocene Catalysts: Production of Polypropylene with Narrow Molecular Weight Distributions*, Macromolecules, vol. 25, pp. 1780-1785 (1992).

Llinas, Geraldo Hidalgo et al., *Crystalline-Amorphous Block Polypropylene and Nonsymmetric ansa-Metallocene Catalyzed Poylmerization*, Macromolecules, vol. 25, pp. 1242-1253 (1992).

Trudell, B.C. et al., *Single Site Catalyzed Ethylene Copolymers: Structure/Property Relationships*, ANTEC '92, pp. 613-617 (1992).

Chein, James C.W. et al., *Metallocene Catalysts for Olefin Polymerizations*, Journal of Polymer Science, vol. 30, pp. 2601-2617 (1992).

Wood, Andrew et al., *The Polyolefin Revolution*, Chemical Week, p. 52 (May 13, 1992).

Leaversuch, R., *Battle for Octene-Equivalency in LLDPE Film Heats Up*, Modern Plastics, pp. 24-26 (Jun. 1992).

Wood, Andrew, *Metallocenes—The Race to Breed a New Generation of Catalysts*, Chemical Week, p. 42, (Jul. 1, 1992-Jul. 8, 1992).

Schwank, G. Don, *Constrained Geometry Catalyst Technology (CGCT) Polymers*, SPO '92 (Sep. 23, 1992).

Martino, R., *New Polyolefin Resins Emerge: 'Branched Linear' Copolymers*, Modern Plastics, pp. 20-25 (Nov. 1992).

*Dow's 1992 Ended with a Welcome Surprise Thanks to the U.S. Patent Office*, p. 2.

Stevens, James C., *INSITE™ Catalyst Structure/Activity Relationships for Olefin Polymerization*, METCON '93 (1993).

Herfert, N., et al., *Copolymerization of Ethene and α-Olefins With Stereorigid Metallocene/MAO Ziegler Catalysts: Kinetic and Mechanistic Insight*, Max-Planck-Institut für Kohlenforschung, Kaiser-Willhelm-Platz 1, 4330 Mülheim, a.d. Ruhr, FRG-PMSE #16.

Collins, S., *Copolymerization of Dienes in the Presence of Cationic Metallocene Catalysts*.

Grubbs, R.H. et al., *Ring Opening Metathesis Polymerization Catalysts*, Division of Chemistry and Chemical Engineering, California Institute of Technology, Pasadena, CA, INOR #353.

Yu, T., *Polyolefin Modification with EXACT™ Plastomers*, pp. 539-564.

Knight, G.W. et al., *Constrained Geometry Catalyst Technology: New Rules for Ethylene α-Olefin Interpolymers—Unique Structure and Property Relationships*, Dow Plastics, Freeport, TX, pp. 226-241 (1993).

Waymouth, R.M. et al., *Cyclopolymerization of Dienes in the Presence of Cationic Metallocene Catalysts*, Department of Chemistry, Standord University, Standord, CA, INOR #355.

Fries, Richard W., et al., *Organometallic Modified Polyolefin Catalysts for Enhanced Molecular Properties*, Quantum Chemical Company, Morris, IL.

Sehanobish, K. et al., *Effect of Chain Microstructure on Modulus of Ethylene-α-Olefin Copolymers*, J. Appl. Pol. S., pp. 887-894 (1994).

Godwin, G., Ltd. in Assoc. w/The Plastics and Rubber Institute, *Flow Properties of Polymer Melts*, p. 71 (1981).

Dealy, John M. et al., *Melt Rheology and it's Role in Plastics Processing*, pp. 374-376 (1990).

Schwank, G. Don, *Single-Site Metallocene Catalysts Yield Tailor-Made Polyolefin Resins*, Modern Plastics, pp. 49-50 (Aug. 1993).

Schwank, G. Don, *A New Family of Resins*, Converting Magazine, pp. 78-80 (Sep. 1993).

Schwank, G. Don, *A New Family of Resins—Part II*, Converting Magazine (Oct. 1993).

Barry, R.P. et al., *Designed Polymers with INSITE Technology*, Polyethylene '93, (Oct. 4, 1993).

Plumley, T.A. et al., *Rheological Molding of INSITE Technology Polymers*, ANTEC '94, pp. 1221-1225 (1994).

*Polymers are Commercial*, Food Engineering, p. 72 (Feb. 1993).

Lancaster, Gerald et al., *Global Product and Application Development Utilizing INSITE Technology*, METCON '94 (May 1994).

Stevens, J., *INSITE Catalyst Str./Activity Relationship for Olefin Polymerization*, METCON (May 1993).

Van der Sanden, D. et al., *A New Family of Linear Ethylene Polymers with Enhanced Sealing Performance*, TAPPI Proceedings, 1991 Polymers, Laminations & Coatings Conference, pp. 289-296.

Swogger, K.W. et al., *Novel Molecular Structure Opens Up New Applications for Insite Based Polymers*, SPO '93.

Mergenhagen, L., *Polyolefin Plastomers as Sealants in Packaging Applications*, TAPPI (Sep. 1993).

Pappas, Chris et al., *AFFINITY Polyolefin Plastomers and ENGAGE Polyolefin Elastomers: . . .*, CMSR (May 1994).

Swogger, K.W. et al., *Improving Polymer Processability Utilizing CGSS Catalyst Technology*, NPEC (Jun. 1994).

"*Exact Polymers For Targeted Performance in Film Packaging*," distributed at PACK Expo, Chicago, Nov. 8-12, 1992.

"CGC Polyolefins Are For Applications With Many Major Packaging Markets, Says Dow," TECHPAK, Oct. 5, 1992.

"*New Polyolefin Resins Emerge: 'Branched Linear' Copolymers*," Modern Plastic Int'l., Nov. 1992, pp. 16-18.

Panagopoulos, Jr., G. et al., "New Generations High Performance LLDPE Blown Film Resins Superior Physical Properties and Processability," Dow Plastics, pp. 266-278.

Speed, C.S., et al., "Structure/Property Relationships in Exxpol™ Polymers," Society of Plastics Entineers, Polyolefins VII Int'l Conference, Feb. 24-27, 1991, pp. 45-66.

Van der Sanden, D., "*A New Family of Linear Ethylene Polymers with Enhanced Sealing Performance*," Proceedings of the 1991 Polymers, Laminations & Coatings Conference, Sep. 3-6, 1991, pp. 289-297.

Van der Sanden, D. et al., "*A New Family Of Linear Ethylene Polymers With Enhanced Sealing Performance Designed For Multilayer Barrier Food Packaging Films*," Proceedings of the 1992 Polymers, Laminations & Coatings Conference, Sep. 8-11, 1992, pp. 103-111.

"A New Family of Enhanced Linear Ethylene Polymers with Enhanced Sealing Performance Brochure", Exxon Chemical.

"Affinity Polyolefins Plastomers Brochure", Dow Chemical Company (1993).

"Dow's Patent on Elastic Substantially Linear Olefin Polymers" The Metallocene Monitor.

Derwent Publication Ltd., London, GB; Class A17, AN 98-128836 XP0020062797, vol. 402, No. 063, (Oct. 10, 1997).

Leaversuch, "Polyethylene—Technology Agreement Hastens Resins Development", Modern Plastics, pp. 26 (Jun. 1992).

Miller, "Technology Watch—Software Predicts Tolerance Stack-Ups in 3D Assemblies From Individual Part Tolerances", Plastics World, pp. 29 (Nov. 1991).

Naitove, "Novel Rheological Behavior Claimed for New-Tech Polyolefins", Plastics Technology, pp. 23-25 (Nov. 1992).

Odian et al., "Principles of Polymerization", 2d Ed., Wiley, New York, pp. 99-102 and 616 (1981).

Pal et al., "Application of Phase change Materials to Thermal Control of Electronic Modules: A Computational Study", EEP-vol. 10-2, Advances in Electronic Packaging ASME 1995, pp. 1307-1315.

Union Carbide Unveils Unipol II Process, . . . , Plastics Focus, vol. 25, No. 5 (Mar. 8, 1993).

Van der Sanden et al., "Exact Linear Ethylene Polymers for Enhanced Sealing Performance", ANTEC 1992, pp. 154-158.

\* cited by examiner

MULTI-LAYER THERMOPLASTIC FILMS AND PACKAGES MADE THEREFROM

This application is a divisional application of U.S. application Ser. No. 08/899,410 filed Jul. 23, 1997, now pending which is a continuation of U.S. application Ser. No. 08/481,685, filed Jun. 7, 1995, now abandoned, which is a continuation-in-part application of U.S. application Ser. No. 08/082,226, filed Jun. 24, 1993, now abandoned.

BACKGROUND OF THE INVENTION

Multilayer films consisting of various polymeric materials have many applications in packaging structures. Polymeric materials are used as films, sheets, lidstock, pouches, tubes and bags. One type of packaging structure for which polymeric materials are used is for the packaging of meats.

Generally, meats are packaged in bags made from heat shrinkable thermoplastic films known as shrink bags. After the film is produced, it is folded and the product is inserted. The air is then evacuated from the bag and the film is sealed along its edges, such as by heat sealing. Subsequently, the film is heated to initiate heat shrinkage about the meat.

In order to successfully serve as the material for a shrink bag, a thermoplastic film must be able to remain intact during the packaging process where it is filled, evacuated, sealed (as by heat-sealing), and heat shrunk. The heat sealing and heat shrinking operations require subjecting the film to high temperatures. Thus, the thermoplastic film must have sufficient strength at high temperatures known as "hot strength". The thermoplastic film must also remain intact during the shipment and handling of the shrink-wrapped product as to physically protect the meat.

In addition to remaining intact during the fabrication of the bag and subsequent handling, the thermoplastic film must also serve as a barrier for the product from gaseous materials in the environment. The film must especially serve as a barrier to the infusion of oxygen, thus preventing spoilage of the product caused by the exposure to oxygen.

It is desirable that the thermoplastic film achieve the properties of a shrink bag while remaining economical to produce. Thus, the resin for the film should be relatively inexpensive, readily extrudable, and the film produced therefrom susceptible to orientation.

Shrink bag packaging of meat has several inherent difficulties, many of which are attributable to limitations in the thermoplastic films. For example, the process of stretching the film and shrinking it expose the film to severe stress conditions due to the nature of the operation. The thermoplastic films are especially vulnerable to failure at these severe conditions.

The thermoplastic film must also be capable of being oriented without distortion, and without delamination of the multiple layers normally present in packaging films. The thermoplastic film must be strong enough at the orientation temperature to withstand stretching without the creation of holes, tears, or non-uniform zones of stretching.

In the case of blown tubular thermoplastic films, the film must be capable of being stretched to form a bubble during the orientation process. Each of the layers of th film should be able to be oriented without fracture, separation, or creation of holes in the layer.

In packaging use, the thermoplastic film must respond to heat rapidly enough for commercial practicality, and yet must not exhibit such a level of shrink energy that would cause the film to pull apart or delaminate as a result of shrinkage from its own internal forces.

Film packages are known in the art to be susceptible to failure or deformation at any location where portions of the films are sealed to each other by heat sealing. In the formation of a heat seal, at least portions of the film are heated to a temperature where they are soft enough to flow and melt merge when subjected to pressure. It is desirable to be able to form heat seals in a film over a range of temperatures and pressures so that commercial processes can be adjusted within the normal operating parameters. Whatever the acceptable range of parameters for the formations of heat seals, it is critical that the seals have adequate strength to hold the package closed, and prevent leakage into or out of the package until it is intentionally opened. Thus, the strength of the heat seals is also an important measure of films used in applications such as shrink bags, where heat seals are formed.

A solution known in the art to the problem of failure or deformation at the heat seals is the cross-linking of the film layers by irradiation prior to heat sealing. Cross-linking the film provides improved toughness and increases the heat seal temperature range.

However, cross-linked thermoplastic films are more difficult to melt and provide weaker seals than unirradiated films when heat sealed. Users require that the seals maintain their integrity when the bag containing meat or other food article is immersed in hot water to shrink the film. A bag with weak heat seals that ruptures when the bag is shrunk, is of no use. Thus, there is a need for an irradiated multiple layer film which can be made into a bag that will have strong seals when heat sealed.

Another important measure of the value of film for use in shrink bag applications is optical clarity. A desirable film has good optical clarity, so that the consumer can view the product clearly and without obstructions. Thus, a desirable film should be free of haze or other imperfections.

U.S. Pat. No. 4,457,960, which is commonly owned with this application and hereby incorporated by reference, discloses multiple layer, molecularly oriented films, and packages made from the films, which may be used in shrink bag applications. The disclosed film contains a first barrier layer, preferably either polyvinylidene chloride copolymer (Saran) or ethylene vinyl alcohol (EVOH), and at least second and third layers, both of which are firmly adhered to the first barrier layer. The second layer comprises a blend of linear low density polyethylene ("LLDPE") and EVA. The third layer comprises ethylene vinyl acetat (EVA) or blends of EVA and linear low density polyethylene.

U.S. Pat. No. 4,894,107, which is also commonly owned with this application and hereby incorporated by reference, discloses multiple layer, molecularly oriented films, and packages made from the films, which may be used in shrink bag applications. The films contain a core barrier layer of vinylidene chloride copolymer (VDC-CP) or vinylidene chloride methylacrylate (VDC-MA), as well as at least two additional layers comprising blends of LLDPE and EVA. U.S. Pat. No. 4,894,107 also teaches electron beam irradiation of the film in an amount of at least 1.5 megarads, preferably 2 to 5 megarads. The irradiation induces cross-linking, thereby improving the hot strength and heat seal properties of the film.

Pending U.S. patent application Ser. No. 08/011,528, which is commonly owned with this application and hereby incorporated by reference, discloses multiple layer films with inner heat sealant layers and outer protective layers that have different degrees of cross-linking at different levels of irradiation doses.

SUMMARY OF THE INVENTION

Applicants have now discovered a new film suitable for making packages for shrink bag applications. The film has improved clarity and other optical properties such as color which are not found in the prior art. The films of the invention also have improved sealability, i.e., higher seal strength and higher burst value.

The improved qualities of the films of the invention are in part due to the use of a polymer, usually a copolymer, formed by a polymerization reaction in the presence of a single site catalyst such as a metallocene. Examples of such a polymer are ethylene and propylene polymers and copolymers thereof.

One preferred copolymer is a copolymer of ethylene and an alpha olefin where such alpha olefin has a carbon chain length of from $C_3$-$C_{20}$. A particular example is the resin Affinity PL 1840, manufactured by Dow Chemical Company.

The structures of the present invention may also include blends of polymers and copolymers formed by a polymerization reaction with a single site catalyst or blends of a polymer and copolymer formed by a polymerization reaction with a single site catalyst and another polymeric material. Examples of suitable polymers for blending include: high and medium density polyethylene (HDPE, MDPE), linear low density polyethylene (LLDPE), low density polyethylene (LDPE), ethylene vinyl acetate (EVA), ultra low density polyethylene (ULDPE or VLDPE), and ionomers such as Surlyn.

The films of the present invention comprise a first core barrier layer of EVOH or EVOH copolymers. Additional second and third layers, one of which serves as a heat sealant layer, are bound to the core layer such as through use of an adhesive. The second and third layers comprise blends of from 0 to 100% of a polymer or copolymer formed by the polymerization reaction with a single site catalyst and from 0% to 100% EVA or EVA copolymers. The heat sealant layer is preferably 100% of a polymer or copolymer formed by the polymerization reaction with a single site catalyst.

Another embodiment of the present invention is a film also comprising a core barrier layer of EVOH or EVOH copolymer. In this embodiment, the EVOH layer is disposed between additional second and third layers of an adhesive. Adjacent to the third layer of adhesive is a fourth layer of an EVA or an EVA copolymer. Adjacent to the fourth layer is a fifth layer of a polymer or copolymer formed by the polymerization reaction with a single site catalyst. The fourth layer serves as the heat seal layer.

In all embodiments of the present invention, the multiple layer film is subjected to irradiation. The desirable qualities of the present invention are in part the result of the use of a polymer or copolymer formed by the polymerization reaction with a single site catalyst in the sealant layer. The polymer or copolymer formed by the polymerization reaction with a single site catalyst has a lesser degree of cross-linking under irradiation than prior art resins. Thus, although the film layers are cross-linked, the sealant layer of the films of the invention is not adversely affected by the irradiation in the manner of prior art cross-linked films. In addition, the films of the invention have improved optical qualities and improved heat sealability.

A substantial end use of the invention is in heat sealable shrink bags for use particularly, although not exclusively, in the packaging of meat. Bags made from the multilayer films of the invention find particular utility in forming packages which are subjected to high temperature shrinking processes.

DETAILED DESCRIPTION OF THE INVENTION

Figure 1:
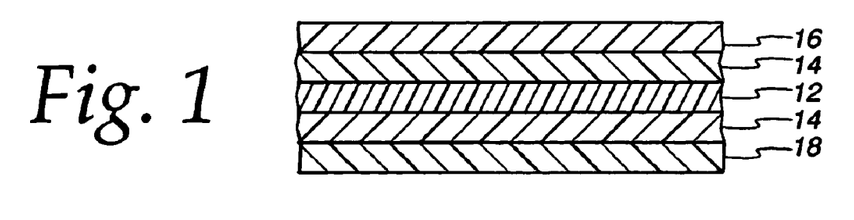
FIG. 1 shows a cross-section of films of this invention.

FIG. 1 shows a cross-section of a first embodiment of the film of the invention. Layer 12 is a core barrier layer, which minimizes the transmission of oxygen through the film. In the present invention, the barrier layer comprises EVOH or EVOH copolymers. Layer 14 is a tie or adhesive layer, which binds the core barrier layer of the film to the additional layers.

Additional layers 16 and 18 comprise either 100% of a polymer or copolymer formed by the polymerization reaction with a single site catalyst, or blends of a polymer or copolymer formed by the polymerization reaction with a single site catalyst and EVA. The blend ranges are from about 99% to about 1% polymer or copolymer formed by the polymerization reaction with a single site catalyst and from about 1% to about 99% EVA or EVA copolymers. Layer 16 is an inner sealant layer, and layer 18 is an outer layer. A preferred composition of the inner sealant layer 16 is 100% of a polymer or copolymer formed by the polymerization reaction with a single site catalyst.

In this embodiment, the core barrier layer 12 has a thickness of between about 10 and about 30 gauge, and is preferably about 20 gauge. The tie or adhesive layers 14 each have a thickness of from about 20 to about 30 gauge, and are preferably about 25 gauge. Inner sealant layer 16 has a thickness of from about 35 to about 55 gauge, and is preferably about 45 gauge, and outer layer 18 has a thickness of from about 105 to about 125 gauge, and is preferably about 115 gauge.

Figure 2:
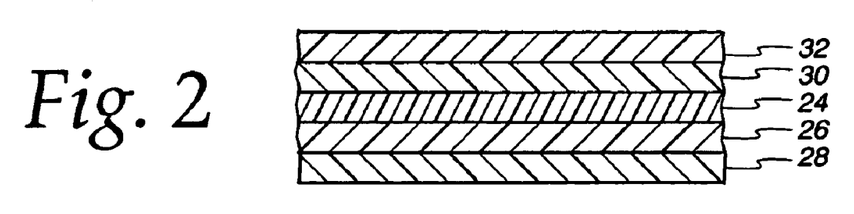
FIG. 2 shows a cross-section of an alternative embodiment of the films of the invention.

FIG. 2 shows a cross-section of a second embodiment of the film. In this embodiment, layer 26 is a core barrier layer, which minimizes the transmission of oxygen through the film. In this embodiment of the invention, the barrier layer 26 comprises EVOH or EVOH copolymer. As in the prior embodiment, the EVOH layer is surrounded by second and third layers 24 and 28 of an adhesive, which adhere the core barrier layer of the film to the additional layers. Layer 30, which is adjacent to adhesive layer 24, is a layer of EVA or EVA copolymers. Layer 32 is an inner sealant layer of a polymer or copolymer formed by the polymerization reaction with a single site catalyst.

In this alternative embodiment, the core barrier layer 26 has a thickness of from about 10 to about 30 gauge, and is preferably about 20 gauge. The tie or adhesive layer 24 has a thickness of from about 15 to about 35 gauge, and is preferably about 25 gauge. The tie or adhesive layer 28 has a thickness of from about 35 to about 55 gauge, and is preferably about 45 gauge. Layer 30, the EVA layer, has a thickness of from about 100 to about 120 gauge, and is preferably about 110 gauge. The inner sealant layer 32 has a thickness of from about 20 to about 40 gauge, and is preferably about 30 gauge.

Figure 3:
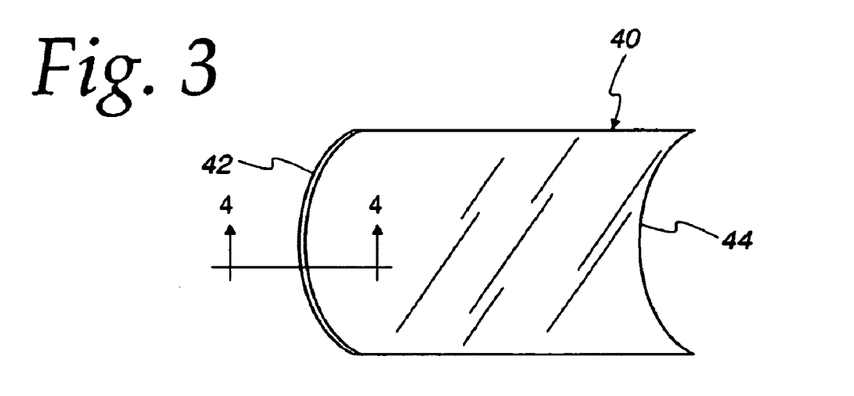
FIG. 3 is a plain view of a bag made according to the invention.

FIG. 3 shows a bag 40 made according to the invention. The empty bag shown is a collapsed tube with one end closed by a heat seal 42 across the end of the tube. The other end of the bag 44 is left open for insertion of the meat, and it is normally closed and sealed when the meat is placed in the bag.

Figure 4:
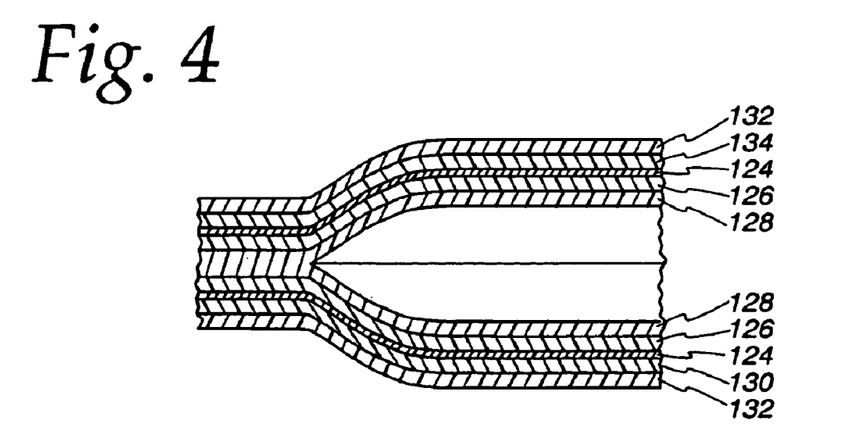
FIG. 4 is a cross-section of the bag of FIG. 1 taken at 2-2 of FIG. 1.

FIG. 4 is a cross-section of the bag in FIG. 3 taken at 2-2 of FIG. 3, made according to the first embodiment of the film. Thus, layer 124 is a core barrier layer, comprising EVOH or an EVOH copolymer, which minimizes the transmission of oxygen through the film. The EVOH layer is disposed between second and third layers 126 and 130, which are tie or adhesive layers that adhere the core barrier layer of the film to the additional layers. Additional layers 128 and 132 are either 100% of a polymer or copolymer formed by the polymerization reaction with a single site catalyst, or comprise blends of a polymer or copolymer formed by the polymerization reaction with a single site catalyst and EVA or EVA copolymers. The blend ranges are from about 99% to about 1% of a polymer or copolymer formed by the polymerization reaction with a single site catalyst and from about 99% to about 1% EVA. Layer 128 is the inner sealant layer, and layer 132 is the outer layer.

The EVOH and EVOH copolymers used in the barrier layer of the present invention are known in the prior art for their use in thermoplastic packaging films as barrier layers. EVOH is an especially effective barrier to gases, including oxygen. EVOH protects food packages against spoilage and enhances the flavor of the food by preventing the penetration of oxygen through the film.

The EVOH copolymers used in the present invention contain various comonomers, at a wide range of concentrations. Some of the EVOH resins used in the invention are listed in the examples described below. However, the EVOH resins of the examples are illustrative only, and are not intended to demonstrate the only EVOH resins that can be used in the invention.

The additional layers 128 and 132 of the film comprise either 100% of a polymer or copolymer formed by the polymerization reaction with a single site catalyst or blends of a polymer or copolymer formed by the polymerization reaction with a single site catalyst and ethylene vinyl acetate.

The single site catalyst reaction is of the type disclosed in co-pending U.S. patent application Ser. No. 08/082,226, which is commonly owned with this application and is hereby incorporated by reference. Further descriptions of the reaction made with a single site catalyst is contained in various publications, including D. Van der Sanden, et al., "A New Family of Linear Ethylene Polymers with Enhanced Sealing Performance Designed for Multilayer Barrier Food Packaging Claims," and B. A. Story, et al., "The New Family of Polymers from Insite™ Technology."

Polymers made with single site catalysts have various desirable qualities, including narrower molecular weight distribution and narrower short chain branching distribution, which are not found in polyethylenes made with the traditional Ziegler-Natta catalyst. Polymers made from the single site catalyst reaction also have increased structural homogeneity in comparison with those made with the traditional Ziegler-Natta catalyst.

The present invention consists of structures that are comprised of polymers or copolymers that have been polymerized in the presence of a single site catalyst, such as a metallocene. A metallocene is a complex organometallic molecule typically containing zirconium or titanium, with a pair of cyclic or alkyl molecules. More specifically, metallocene catalysts are usually compounds with two cyclopentadiene rings fixed to the metal. These catalysts are frequently used with aluminozane as a cocatalyst or an activator, one suitable aluminozane is a methaliumoxane (MAO). Besides titanium and zirconium, hafnium may also be used as the metal to which the cyclopentadiene is bonded. Alternative metallocenes may include Group IVA, VA and VIA transition metals with two cyclopentadiene rings. Also mono-cyclopentadiene rings or sibyl amides may alternatively be in the metallocene instead of two cyclopentadienes. Other metals to which the cyclopentadine may be attached may include the metals in the lanthanide series.

While the reaction mechanism is not completely understood, it is believed that the metallocene, single site catalyst confines the copolymerization reaction to a single site over the polymer thus controlling comonomer placement and side chain length and branching. The copolymers formed from metallocene single site catalysts are highly stereo regular products with narrow molecular weight distribution. The metallocenes can be used to polymerize ethylene, propylene, ethylenic and acetylenic monomers, dienes and carbon monoxide. Comonomers with ethylene and propylene include styrene, substituted styrene, vinyl, acrylonitrile, methyl acrylate, methyl methacrylate and 1,4-hexadiene. The metallocene single site catalysts are capable of producing isotactic polymers and syndiotactic polymers, i.e., polymers in which the crystalline branches alternate regularly on both sides of the back bone of the polymer. There are two general types of single site catalyst reactions. The first are nonstereoselective catalysts reactions which have been developed by Exxon and Dow and which are used to make Exxon's Exact resins and Dow's CGCT resins. See FIGS. 3 and 4. The second type of reactions are stereoselective catalysts developed by Hoechst and Fina for stereo specific polymerization particularly of polypropylene and other olefins such as butene-1, and 4 methylpentene-1. See, e.g., FIGS. 5 and 6.

The ethylene alpha olefins polymerized by a single site catalyst have low crystallinity and a density that ranges from 0.854 to 0.97 gm/cc/ Although this density range is similar to conventional ethylene polymers, i.e., LDPE, LLDPE and ULDPE, the polymers in the structures of the present invention have a narrow molecular weight distribution and homogeneous branching. The molecular weight distribution of the preferred polymers may be represented by the formula $$MWD=M_w/M_n=<2.5$$

In addition, the melt processability of these polymers ($I_{10}/I_2$) has a range of about 5.5 to about 12 while conventional homogeneous polymers are generally less than 6.5 at an MWD of 2. The melt tension of these polymers is in the range of about 1.5 to 3.5 grams.

The MWD of these polymers may be determined using a Water's 150 GPC at 140° C. with linear columns (103, A-10° A°) from Polymer Labs and a differential refractometer detector. Comparison of the MWD of a 1MI, 0.920 density CGCT polymer with that of 1MI, 0.920 density conventional LLDPE illustrates the very narrow MWD of the CGCT polymers which usually have a $M_w/M_n$ of approximately 2 compared to 3 or greater for LLDPE.

The polymers or copolymers formed by the polymerization reaction with a single site catalyst used in the examples below are illustrative of the polymers or copolymers formed by the polymerization reaction with a single site catalyst that are used in the invention, but are not intended to define the only polymers or copolymers formed by the polymerization reaction with a single site catalyst resin that can be used in the invention.

EVA and EVA copolymers are often used in packaging film applications for their flexibility and toughness, their adhesive qualities, and the superior stress crack resistance. The ethylene vinyl acetate copolymers or EVA resins that are blended with ULDPE contain various additional thermoplastic materials with contents ranging from about 5% to about 50% vinyl acetate.

Generally, as the vinyl acetate concentration of the EVA copolymer increases, the clarity of the film improves and the low-temperature flexibility, stress-crack resistance, and impact strength all increase. Meanwhile, an increase in vinyl acetate concentration causes a decrease in the softening and sealing temperatures as well as barrier properties.

The EVA resins used in the examples below are illustrative of the EVA resins that may be used in the invention, and are not intended to demonstrate the only EVA resins that can be used in the invention.

The adhesive layer can comprise any of the several adhesives common in the trade. The adhesives used in the film may be a thermoplastic hot melt adhesive, such as a polyethylene, polyamide, or an EVA copolymer such as anhydride modified EVA. Other potential substances which can be used as adhesives are rubber-based adhesives, polyurethanes, and cyanoacrylates.

As is common in the art, the films of the invention have been irradiated to effect certain desirable changes in the physical properties of the film. Irradiation breaks the chemical bonds in the resins, causing ionization of the molecules. This leads to crosslinking, i.e., chemical bonds being formed between the molecules in adjacent polymer chains.

The films of the invention may be subjected to several methods of irradiation. One such method which is described in the examples below, is by electron beam irradiation. The electron beam method, however, is only illustrative of one of the methods which may be used, and is not intended to suggest that other methods may not be used.

The word "package" as used herein is defined to include container articles which do not have a product therein as well as container articles that include products therein. A package may be closed and sealed, or otherwise closed, or alternatively may be opened.

While the invention has been described in two embodiments as a five layer film, it should be appreciated that the film may comprise additional layers. Thus, additional layers may be disposed on either side of the five layer structures of the previously described embodiments. Also, additional interior layers may be disposed between the inner sealant layer and the outer layer. Adhesive layers may be disposed between the five layer structures of the embodiment and any additional layers.

EXAMPLES

Samples of five layer heat shrinkable bags of various structures of the invention were constructed. Each of the bags made had outer layers of a ULDPE with a thickness of 90 gauge, inside layers of adhesive with a thickness of 25 gauge, and a core layer of EVOH having a thickness of 20 gauge.

Variable 2 was a five layer structure having the following structure, from outer layer to inner layer, with the layer thicknesses indicated:

ULDPE/ULDPE/EVOH/ULDPE/ULDPE

The ULDPE resin used in variable 2 was ULDPE 3651-00, manufactured by Dow Chemical Company. The EVOH resin used was ST230, a resin manufactured by Nippon Gohsei Company.

Variable 6 was a five layer structure having the following structure, from outer layer to inner layer, with the layer thicknesses indicated:

ULDPE/adhesive/EVOH/adhesive/ULDPE

As in variable 2, the particular ULDPE resin used in variable 6 was ULDPE 3651-00, manufactured by Dow Chemical Company. The EVOH resin used in variable 6 was LC-H101-A manufactured by EVAL Chemical Company. The adhesive resin was Bynel E-331, manufactured by E.I dupont & de Nemours, Inc.

Variable 9 was a five layer structure having the following structure, from outer layer to inner layer:

ULDPE/adhesive/EVOH/adhesive/ULDPE

The ULDPE resins and EVOH resins used in variable 9 were the same as those used in variable 6. The adhesive resin used in variable 9 was Bynel E-406, manufactured by E.I. duPont & deNemours, Inc.

The films constructed from the terms of the invention were then tested for various physical properties common in the art of making multilayer polymeric films, including shrink properties, puncture strength and adhesion.

The shrink properties were obtained measuring the percent free shrink for each of the films at a temperature of 180° F., both in the machine direction (MD) and the cross-machine direction (CMD).

| VARIABLE NO. | FILM THICKNESS (MILS) | PERCENT SHRINK | |
|---|---|---|---|
| | | MD | CMD |
| 2 | 2.40 | 19 | 28 |
| | 2.43 | 17 | 28 |
| | 2.44 | 18 | 30 |
| 6 | 2.31 | 20 | 30 |
| | 2.43 | 21 | 33 |
| | 2.45 | 20 | 31 |
| 9 | 2.26 | 20 | 30 |
| | 2.35 | 20 | 31 |
| | 2.38 | 19 | 29 |

The shrink bags of the invention were also measured for their puncture strength according to the Instron method. Under this test, a 4" by 4" sample of the film was obtained and fixed in a holder. The sample of the film was then subjected to a probe having a tip of approximately 6 mm. in diameter. The probe tip was moved from the top to the bottom of the film sample at a certain speed. The probe measured the strength of the film by recording the maximum strength value, or peak value, before the film was punctured, in pounds.

The following average values were recorded for variables 2, 6 and 9:

| VARIABLE | PUNCTURE STRENGTH (LBS.) |
|---|---|
| 2 | 13.5 |
| 6 | 12.4 |
| 9 | 11.3 |

The shrink bags were also measured for their adhesive qualities. The adhesion between each of the various layers of the film was measured. In the test of adhesion, the ends of the film were clamped with the Instron grip, and the film specimen was pulled apart using a supported 90° tail. For each of variables 2, 6 and 9, it was found that the EVOH and tie layers could not be separated.

The foregoing examples are representative of the types of heat shrinkable films that may be made according to the invention. These examples are not intended to demonstrate the only films that may be made according to the invention.

Further modifications of the invention will be apparent to those skilled in the art and all such modifications are deemed to be within the scope of the invention as defined in the following claims.

What is claimed is:

1. A multilayer polymeric film, comprising:
   (a) a first barrier layer, having first and second opposing surfaces;
   (b) second and third adhesive layers disposed on opposing surfaces of said first layer;
   (c) a fourth layer comprising ethylene vinyl acetate copolymer and disposed adjacent to said third layer; and
   (d) a fifth layer comprising a vinylidene chloride copolymer formed by a polymerization reaction in the presence of a single site catalyst and disposed adjacent to said fourth layer;
   wherein said film is irradiated.

2. A multiple layer polymeric film as in claim 1, said first barrier layer comprising ethylene vinyl alcohol copolymer.

3. A multiple layer polymeric film as in claim 1, wherein said first barrier layer has a thickness of about 20 gauge, said second and third layers each has a thickness of about 25 gauge, said fourth layer has a thickness of about 45 gauge, and said fifth layer having a thickness of about 115 gauge.

4. A package made from the film of claim 1.

5. The multiple layer polymeric film of claim 1, wherein said copolymer in said fifth layer, formed by a polymerization reaction in the presence of a single site catalyst, has a molecular weight distribution of less than 2.5 and a $I_{10}/I_2$ ratio from about 7 to about 12.

* * * * *

UNITED STATES PATENT AND TRADEMARK OFFICE
CERTIFICATE OF CORRECTION

PATENT NO. : 7,316,833 B1 Page 1 of 1
APPLICATION NO. : 09/369980
DATED : January 8, 2008
INVENTOR(S) : Deane E. Galloway et al.

It is certified that error appears in the above-identified patent and that said Letters Patent is hereby corrected as shown below:

On the Title Pg, under the Assignee Item (73):
Please replace "Penchiney" with --Pechiney--.

On the Title Pg, in the References Cited Item (56) under U.S. Patent Documents:
Please replace "Hodson" with --Hodgson--.

On the Title Pg, in the References Cited Item (56) under U.S. Patent Documents:
Please replace "Hodson" with --Hodgson--.

On the Title Pg, in the References Cited Item (56) under Other Publications:
Please replace "*Exxon Cities Breakthrough*" with --*Exxon Cites Breakthrough*--.

On the Title Pg, in the References Cited Item (56) under Other Publications:
Please replace "Standord University, Standord, CA" with --Stanford University, Stanford, CA--.

Signed and Sealed this

Fourteenth Day of July, 2009

JOHN DOLL
*Acting Director of the United States Patent and Trademark Office*